United States Patent [19]
Widen

[11] 3,988,910
[45] Nov. 2, 1976

[54] LOCKING DEVICE FOR A SPOKE WHEEL OF A BICYCLE, MOPED OR SIMILAR VEHICLE

[75] Inventor: Bo Gustaf Widen, Torshalla, Sweden

[73] Assignee: GKN-Stenman AB, Eskilstuna, Sweden

[22] Filed: Sept. 10, 1974

[21] Appl. No.: 504,786

[52] U.S. Cl. ............................ 70/227; 70/226; 211/5
[51] Int. Cl.² ............... B60R 25/00; B62H 5/18
[58] Field of Search ............ 70/207, 208, 209, 225, 70/226, 227, 233, 236; 211/5

[56] References Cited
UNITED STATES PATENTS

| | | | |
|---|---|---|---|
| 542,507 | 7/1895 | Tafel | 70/226 |
| 557,900 | 4/1896 | Shannon | 211/5 X |
| 564,623 | 7/1896 | Kell | 70/227 X |
| 570,521 | 11/1896 | Turton | 70/227 |
| 603,780 | 5/1898 | Wright | 70/227 |
| 641,301 | 1/1900 | Klose | 70/227 |
| 1,438,004 | 12/1922 | Vincent | 70/209 X |
| 1,853,162 | 4/1932 | Jacobi | 70/208 X |
| 3,438,227 | 4/1969 | Wolniak | 70/208 |
| 3,788,109 | 1/1974 | Lane | 211/5 X |

FOREIGN PATENTS OR APPLICATIONS

| | | | |
|---|---|---|---|
| 412,676 | 2/1946 | Italy | 70/227 |

*Primary Examiner*—Paul R. Gilliam
*Assistant Examiner*—Carl F. Pietruszka
*Attorney, Agent, or Firm*—Sughrue, Rothwell, Mion, Zinn and Macpeak

[57] ABSTRACT

A locking device for locking a spoked wheel carried in fork prongs comprises a housing mountable on one fork prong, and locking pin receiving means mountable on another fork prong. The housing is provided with a lock lever that is movable between a release position in which the wheel is free to rotate and a locked position in which the lock lever is in line with said locking pin receiving means. A locking pin is mounted within the lock lever and may be moved to protrude from one end of a bore extending through the lock lever. A lock member adapted to move the locking pin is provided adjacent the other end of said bore. The housing and the lock lever are so formed that the lock lever is retained in the locked position between the housing and the locking pin receiving means on removal of a support axle for the lock lever by force.

11 Claims, 5 Drawing Figures

LOCKING DEVICE FOR A SPOKE WHEEL OF A BICYCLE, MOPED OR SIMILAR VEHICLE

This invention relates to a locking device and, more particularly, to a locking device for use in conjunction with a spoked wheel carried in a fork of a bicycle, moped or similar vehicle to secure the vehicle against theft.

According to this invention there is provided a locking device for locking a spoked wheel carried in fork prongs, said locking device comprising a housing mountable on one fork prong, and locking pin receiving means mountable on another fork prong, said housing being provided with a lock lever that is movable between a release position in which the wheel is free to rotate, and a locked position in which the lock lever is in line with said locking pin receiving means. A locking pin is mounted within the lock lever and may be moved to protrude from one end of a bore extending through the lock lever, and a lock member is provided adjacent the other end of said bore and is adapted to move the locking pin.

The lock lever is a hollow body, which, without being cumbersome provides a stable and reliable locking device. Further, the bore in the lock lever facilitates mounting of the displaceable parts such as the locking pin and lock member. The lock member is preferably actuated by a key that is axially insertable in the bore.

A locking device according to the invention can be advantageously formed as an integral part of the frame structure, so that in relation to earlier known locks it is considerably more difficult to pick.

The lock member may comprise a cylinder lock displaceably arranged in the lock lever. The cylinder lock can be of a conventional type and have a very large number of possible key combinations.

In a practically preferred embodiment, the housing and the lock lever are so formed that, even if the bearing axle of the lock lever is removed by force, the lock lever will be retained in the locked position between the housing and the locking pin receiving means.

For this purpose, the housing may comprise an upper surface which, when the lock lever is in the locked position, cooperates with a protrusion formed on the lock lever. A lower surface is provided on the housing to cooperate with a portion of the surface of the lock lever so that the lock lever, when in the locked position, is retained between the surfaces and the locking pin receiving means. The housing and/or the receiving means preferably constitute integral parts of the respective fork prongs.

It is further preferable that the lock lever is spring biased away from the release position and means may be provided to secure the lever in the release position. The spring will thus tend to move the lock lever towards the locked position, so that when the lock is unlocked the lock lever will remain in the locked position. The risk of damage being caused by the lock lever in connection with maneuvering of the lock is thus reduced.

The housing and/or the locking pin receiving means preferably constitute, as mentioned above, an integral part of the respective fork prong, however, they can also be welded thereto.

In one embodiment the bore of the lock lever comprises two parts, preferably concentric, located close to the axis of the locking pin, arranged to receive the lock member.

The lock member can be made of a lock cylinder provided with locking plates, and arranged for interaction with cams provided in the bore in the lock lever such that the lock cylinder, with the key inserted, can be axially displaced. This causes the locking pin to be displaced out of one end of the lock lever so that said locking pin can enter the locking pin receiving means on the other fork prong. The lock cylinder can thereafter be turned through, for instance, 90°, to fix the locking pin and lock cylinder in the locked position.

Since the two receiving parts of the bore located close to the lock cylinder are preferably concentric with the geometrical axis of the locking pin and the geometric axis of the part of the bore that receives the locking pin, only simple manufacturing techniques need be utilised to fabricate those sections of the lock lever that house the moving parts. At the same time, protection against picking of the lock is improved. Any attempt to break up the lock by inserting a tool into the keyhole of the lock cylinder and striking the tool with a hammer will only result in the lock cylinder being more firmly fixed in the locked position. Thus removal of the locking pin from the locking pin receiving means is rendered impossible.

A further advantage of the invention is that the lock lever, despite its robust and durable construction, can be given a simple and attractive shape. In practice it is preferred that the lock lever have the shape of a hollow cylindrical body with protrusions thereon, which, except for the protrusion, has substantially the same outside cross-sectional measurement, along its entire length.

A further advantage of one particular embodiment of the locking device is that even if the support axle of the lock lever were to be removed by force the lock lever is retained in the locked position.

In practice, it is preferred that a protrusion on the lock lever interacting with an upper surface of the housing be provided with an aperture for the support axle.

BRIEF DESCRIPTION OF THE DRAWINGS

In order that the invention may be more readily understood and so that further features thereof may be appreciated the invention will now be described by way of example with reference to the accompanying drawings in which.

DETAILED DESCRIPTION OF THE PREFERRED EMBODIMENT

Figure 1:
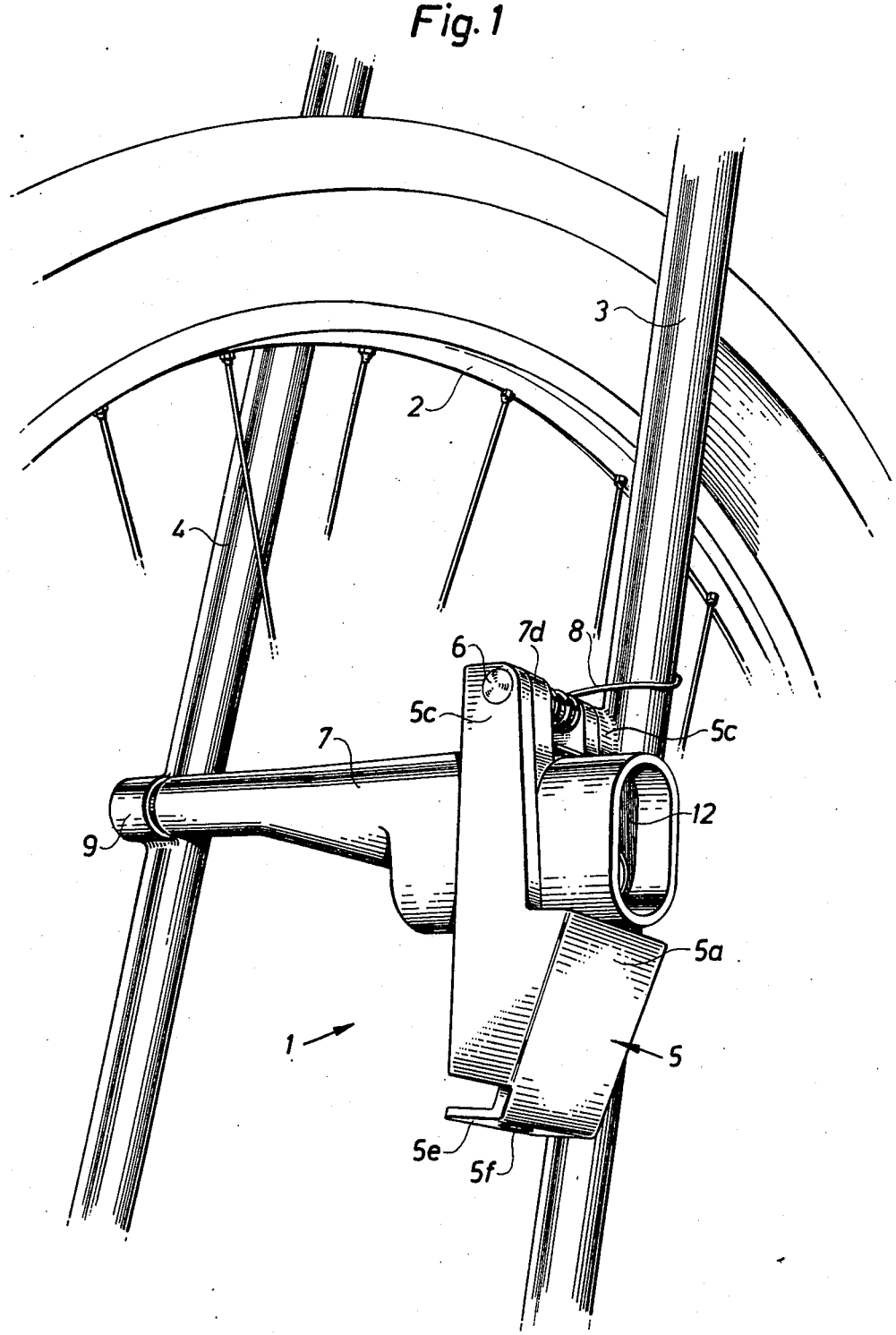
FIG. 1 is a perspective view of a locking device in accordance with the invention mounted on the forks of a bicycle for locking a wheel.
Figure 2:
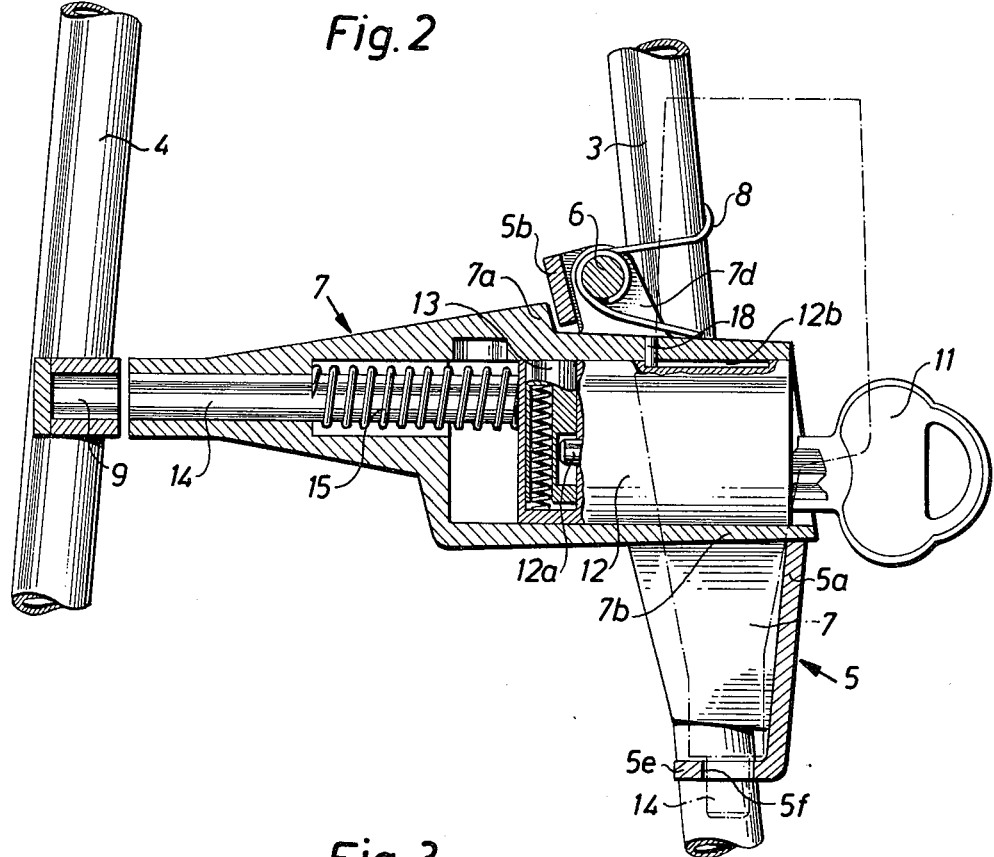
FIG. 2 is a cross-section through the locking device shown in FIG. 1 in the unlocking position, with the outline of the lock lever shown in phantom when in the release position, the wheel not being shown.
Figure 3:
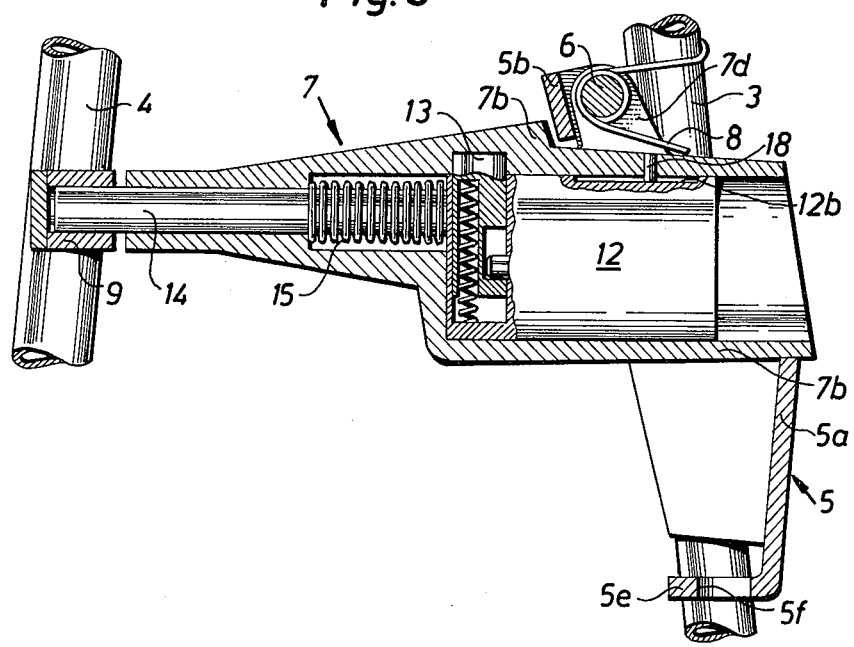
FIG. 3 is a cross-section, corresponding to that of FIG. 2, of the locking device shown in FIG. 1 in the locked position, the wheel not being shown.
Figure 4:
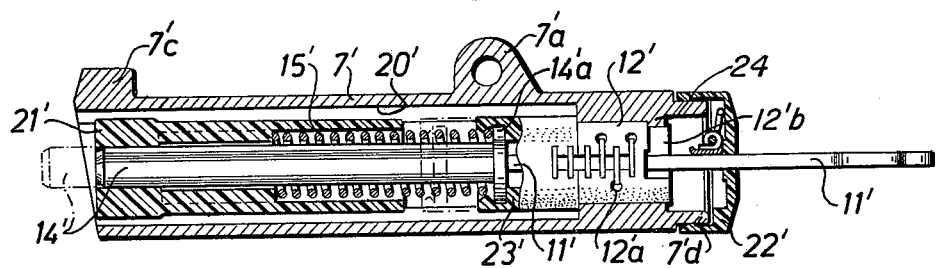
FIG. 4 is a cross sectional view of an alternative locking lever in accordance with the invention.
Figure 5:
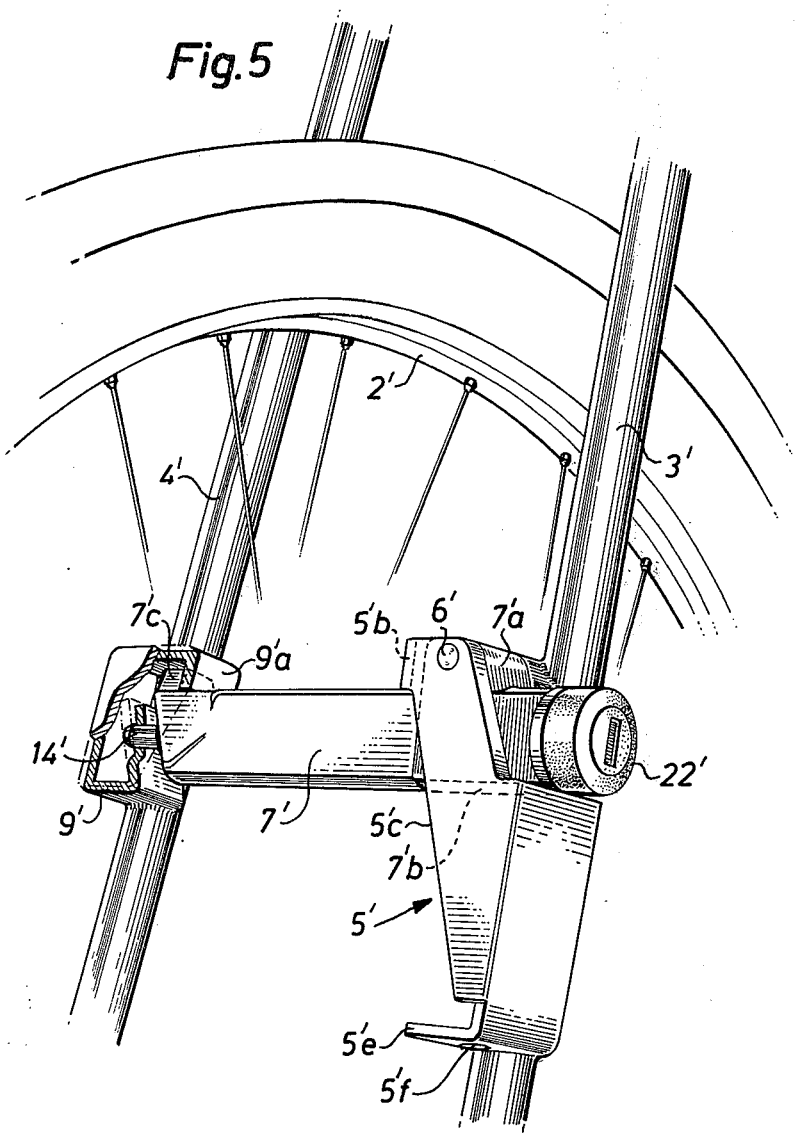
FIG. 5 is a perspective view, partially broken away, of the lock lever and associated parts of the locking device shown in FIG. 4.

Members of the locking device shown in FIGS. 4 and 5 that correspond with members of the locking device shown in FIGS. 1 to 3 have been given the same reference numerals as the members of the device shown in FIGS. 1 to 3 with the addition of a prime.

Referring to FIGS. 1 to 3 a locking device 1 for locking a spoked wheel 2 of a bicycle, moped or similar vehicle having a spoked wheel carried in a fork having prongs 3,4 comprises a support housing 5 mounted on one fork prong 3. The support housing 5 illustrated in FIGS. 1 to 3 is welded to the fork prong 3 to form an integral part of the fork. However, it is to be understood that the support housing 5 could be secured to the fork prong in a releasable manner by means of clamps, screws or other such devices.

The support housing 5 comprises a support axle 6 for a lock lever 7. The lock lever 7 is swingable from first position shown in FIG. 1, in which one end of the lever is in line with a receiving sleeve 9 attached to the other fork prong 4, to a second position in which the lock lever 7 is substantially in line with the fork prong 3. When the lock lever 7 is in the second position a surface 5a of the support housing engages the lock lever 7 and prevents further swinging of the lock lever. A spring 8 is provided to bias the lock lever towards said first position.

The receiving sleeve 9 illustrated in FIGS. 1 to 3 is welded to the fork prong 4 so that it comprises an integral part of the fork, but it is to be understood that it could be releasably secured to the fork prong 4 by means of clamps, screws or other such devices.

The lock lever 7 is in the form of an elongate member and has an elongate axial bore extending therethrough. The axial bore comprises three portions, one being of large diameter, one of intermediate diameter and one of small diameter. The lock lever 7 houses a cylinder lock 12 within the large diameter portion of the bore. The cylinder lock 12 is of a conventional type and may be actuated by key 11. The cylinder lock is axially displaceable in the bore with the aid of the key 11 and interacts via a journal 12a and a spring-actuated detent 13 with a locking pin 14. When in the locked position, (FIG. 3) one end of locking pin 14 protrudes out of the lock lever 7 and enters the receiving sleeve 9 attached to the other fork prong 4.

The locking pin 14 extends axially through the portions of the bore of intermediate diameter and small diameter and is movable towards the locked position against the bias of a helical spring 15, which is located in the portion of the bore of intermediate diameter. The spring 15 biases the locking pin towards the release position, as shown in FIG. 2. This occurs when the cylinder lock 12 is actuated with the key 11 to remove one end of said detent 13 from a recess formed in the wall of the portion of the bore of large diameter, and moved to the right as in FIG. 2.

The cylinder lock 12 is retained in the large diameter bore of lock lever 7 by means of a detent pin 18 which extends through an aperture in the wall of the bore and engages a groove 12b formed in the exterior surface of the cylinder lock 12.

The support housing 5 comprises two arms 5c which are arranged in substantially vertical spaced parallelism. The upper parts of the arms 5c are interconnected by an intermediate member which forms a surface 5b of the housing. The upper parts of the arms 5c also hold the support axle 6 on which the lock lever 7 is mounted. The lower parts of the arms 5c are interconnected by a further member, one edge of which constitutes the aforementioned surface 5a. A portion of the further member below the engagement surface 5a is bent inwardly to form an angled section 5e having an aperture 5f. The aperture 5f retains the locking pin 14, when the lock lever 7 is in the release position substantially parallel with the fork prong 3 as shown in broken lines in FIG. 2. The lever 7 is pivoted on the axle 6 so as to enable the locking pin 14 to engage the aperture 5f.

The support housing 5 and the lock lever 7 are so formed that if the support axle 6 of the lock lever 7 is removed by force when the lever is in the locked position, the lock lever is retained in the locked position between the support housing 5 and the receiving sleeve 9. The support housing 5 has an upper surface 5b adjacent the support axle 6, which surface contacts a protrusion 7a on the lock lever. The upper edge of the surface 5a also contacts the region 7b of the lock lever 7 which contains the cylinder lock, so that, when in the locked position, the lock lever is secured between the surfaces 5a, 5b and the receiving sleeve 9 attached to the fork prong 4.

The key 11 can be removed in the usual manner when the lock is in both the locked and the release positions. As, however, the lock lever is retained in the release position substantially parallel with the fork prong 3 by means of the locking pin 14, it can be seen that the locking pin will only be in the retracted position while the lock lever is being swung between the locked and the release positions.

In FIGS. 4 and 5 a further embodiment of the locking device is illustrated mounted on a bicycle or moped having a spoked wheel 2'. The locking device comprises a support housing 5' attached to the fork prong 3' of the bicycle. The support housing 5' illustrated constitutes an integral part of the fork and is welded to the fork, but it is to be understood that the support housing 5' may be releasably secured to the fork by means of clamps, screws or similar devices.

The support housing 5' has a support axle 6' for a lock lever 7' which is swingable from a first position shown in FIG. 5 in which the lock lever 7' is aligned with a receiving sleeve 9' attached to the other fork prong 4', to a second position in which the lock lever 7' is substantially in line with the fork prong 3'. In the first position surface 5'b of the support housing 5', together with surface 9'a of the receiving sleeve 9' engage the lock lever 7' to prevent further swinging of the lock lever 7'.

The receiving sleeve 9' is illustrated as being welded to the fork prong 4' so that the sleeve 9' comprises an integral part of the fork. However it is to be understood that the sleeve 9' could be secured to the fork by means of clamps, screws or similar devices.

The lock lever 7' is an elongate member which is provided with an elongate axial bore 20' therethrough, a part of which contains a locking pin 14', which is surrounded by a sleeve 21' of plastic polytetra-fluoroethylene or similar material. The locking pin 14' is movable to the locked position against the bias of a spring 15'. At one end of the lock lever the bore 20' has a reduced diameter portion to receive a lock cylinder 12' provided with locking plates 12'a. The bore 20' and the lock cylinder 12' are provided with suitably formed shoulder 24 and grooves 12'b respectively, so that when the key 11' is inserted in the lock cylinder, the locking plates 12'a take up the retracted position, the lock cylinder may be displaced axially, thus driving the locking pin 14' to occupy the locked position. Thereafter the lock cylinder is turnable for fixing of the locking pin in the said locked position. The key 11'a can then be removed, whereupon the plates 12'a help to further fix the lock cylinder, so that picking of the lock by force is rendered impossible.

The lock lever has the shape of a hollow cylindrical body substantially the same outside cross-section along its entire length, except for the protrusions 7'a and 7'c. Appropriately, however, the part housing the lock cylinder is provided with two flat, parallel sides to facilitate the swinging movement of the lock lever mounted in the support housing 5'. The end 7'd of the lock lever has a largely circular-cylindrical cross-section, the outside diameter being slightly reduced in relation to the other outside dimensions of the lock lever in order to allow room for an end cap 22' of conventional type with a hole for the key 11' to be secured to the lock lever.

The protrusion 7'a on the lock lever is provided with an aperture through which passes the support axle 6' of the locking device. The end of the protrusion 7'a directed towards the protrusion 7'c is arranged for interaction with a surface 5'b of the housing 5'. Similarly, the end of the protrusion 7'c directed towards the protrusion 7'a is arranged for interaction with the surface 9'a of the receiving sleeve 9'.

The lock cylinder 12' interacts with a sleeve member 23' which houses an end flange 14'a secured to the locking pin 14'.

What is claimed is:

1. A locking device for locking a spoked wheel carried in a plurality of fork prongs said locking device comprising: a housing attached to one fork prong; locking pin receiving means attached to another fork prong; a lock lever having a bore therethrough and being pivotally attached to said housing by way of an axle located non-coplanar with the axis of the bore, the lock lever being movable between a release position in which the wheel is free to rotate and a locked position in which the lock lever is in line with said locking pin receiving means, a locking pin movably mounted within the lock lever such that it may be moved to protrude from one end of the bore extending through the lock lever to engage said locking pin receiving means; a lock member mounted in the lock lever and engaging the locking pin so as to move the locking pin into and out of engagement with the locking pin receiving means, wherein the lock member is lockable by means of a key insertable into the lock member in a direction parallel to the axis of the locking pin, and at least three surfaces on the lock lever which are closely adjacent to corresponding surfaces on the locking pin receiving means and the housing such that at least one of the surfaces contacts its corresponding surface to retain the lock lever in its locked position upon removal of the axle.

2. A locking device according to claim 1, wherein the lock lever has a protrusion thereon and the housing has an upper surface which is closely adjacent to the protrusion when the lock lever is in the locked position and a lower surface which is closely adjacent to a section of the lock lever when in the locked position, so that the lock lever in the locked position is kept enclosed between the upper and lower surfaces and the locking pin receiving means.

3. A locking device as claimed in claim 2, wherein said protrusion is provided with an aperture for the support axle on which said lock lever is mounted.

4. A locking device according to claim 1, wherein at least one of the housing or the locking pin receiving means are formed integrally with said fork prongs.

5. A locking device according to claim 1, further comprising means to retain the lock lever in the release position.

6. A locking device according to claim 1, wherein a spring is provided to bias said lock lever to the locked position.

7. A locking device according to claim 1, wherein the bore extending through the lock lever comprises two adjacent portions of differing diameters adapted to receive the lock member.

8. A locking device according to claim 7, wherein all the portions of the bore are co-axial.

9. A locking device according to claim 1, wherein the lock lever has a projection adapted to co-operate with a corresponding engagement surface of the locking pin receiving means.

10. A locking device according to claim 1, wherein the lock lever has the shape of a hollow cylindrical body with protrusions thereon, the body having a substantially uniform external cross-section apart from said protrusions.

11. A locking device according to claim 1, wherein the locking pin is displaceable in a guide sleeve inserted in said bore.

* * * * *